US012520065B2

(12) United States Patent
Peng

(10) Patent No.: US 12,520,065 B2
(45) Date of Patent: Jan. 6, 2026

(54) ADVERTISING AN IP ADDRESS OF LOOPBACK INTERFACES TO PARTICIPATING OSPF AREAS

(71) Applicant: Ciena Corporation, Hanover, MD (US)

(72) Inventor: Cheng Peng, Nepean (CA)

(73) Assignee: Ciena Corporation, Hanover, MD (US)

( * ) Notice: Subject to any disclaimer, the term of this patent is extended or adjusted under 35 U.S.C. 154(b) by 308 days.

(21) Appl. No.: 18/460,136

(22) Filed: Sep. 1, 2023

(65) Prior Publication Data

US 2025/0080882 A1    Mar. 6, 2025

(51) Int. Cl.
*H04Q 11/00*     (2006.01)
*H04J 14/02*     (2006.01)
*H04L 45/02*     (2022.01)
*H04L 45/74*     (2022.01)

(52) U.S. Cl.
CPC ........ *H04Q 11/0003* (2013.01); *H04J 14/021* (2013.01); *H04L 45/04* (2013.01); *H04L 45/74* (2013.01); *H04Q 11/0062* (2013.01)

(58) Field of Classification Search
CPC ............... H04J 14/021; H04Q 11/0003; H04Q 11/0062; H04L 45/04; H04L 45/74
USPC ..................................................... 398/45, 58
See application file for complete search history.

(56) References Cited

U.S. PATENT DOCUMENTS

| | | | |
|---|---|---|---|
| 10,819,574 B2 | 10/2020 | Peng | |
| 10,819,679 B2 | 10/2020 | Peng | |
| 11,284,172 B2 | 3/2022 | Peng | |
| 2007/0214275 A1* | 9/2007 | Mirtorabi | H04L 45/18 709/230 |
| 2012/0099858 A1* | 4/2012 | Moore | H04L 45/03 398/45 |
| 2015/0092785 A1* | 4/2015 | Torvi | H04L 45/32 370/401 |
| 2016/0173363 A1* | 6/2016 | Torvi | H04L 45/12 370/401 |
| 2020/0044917 A1* | 2/2020 | Peng | H04L 41/0803 |
| 2021/0392418 A1* | 12/2021 | Peng | H04Q 11/0062 |
| 2022/0337544 A1 | 10/2022 | Peng et al. | |

OTHER PUBLICATIONS

J. Moy, "OSPF Version 2," The Internet Society, Network Working Group, Category: Standards Track, Apr. 1998, 224 Pages.
A. Zinin et al., "Alternative Implementations of OSPF Area Border Routers," The Internet Society, Network Working Group, Category: Informational, Apr. 2003, 12 Pages.
D. Papadimitriou et al., "Optical Rings and Hybrid Mesh-Ring Optical Networks," Network Working Group, Internet Draft, Feb. 2001, 38 Pages.
Oct. 22, 2024 International Search Report and Written Opinion for International Patent Application No. PCT/US2024/043959.

* cited by examiner

*Primary Examiner* — Li Liu
(74) *Attorney, Agent, or Firm* — Baratta Law PLLC; Lawrence A. Baratta, Jr.

(57) ABSTRACT

Systems and methods for advertising an Internet Protocol version 4 (IPv4) address of loopback interfaces to participating Open Shortest Path First (OSPF) areas include operating a plurality of interfaces with at least two interfaces being connected to different OSPF areas and having a loopback address; and advertising the loopback address to each of the OSPF areas in a router Link State Advertisement (LSA).

14 Claims, 5 Drawing Sheets

ADVERTISING AN IP ADDRESS OF LOOPBACK INTERFACES TO PARTICIPATING OSPF AREAS

FIELD OF THE DISCLOSURE

The present disclosure relates generally to networking and computing. More particularly, the present disclosure relates to systems and methods for advertising an Internet Protocol (IP) address of loopback interfaces to participating Open Shortest Path First (OSPF) areas.

BACKGROUND OF THE DISCLOSURE

OSPF is a link-state routing protocol and is described, e.g., in RFC 2328, "OSPF version 2," April 1998, the contents of which are incorporated by reference in their entirety. OSPF is designed to be run internal to a single Autonomous System. Each OSPF router maintains an identical database describing the Autonomous System's topology. From this database, a routing table is calculated by constructing a shortest-path tree. OSPF recalculates routes quickly in the face of topological changes, utilizing a minimum of routing protocol traffic. OSPF provides support for equal-cost multipath. An area routing capability is provided, enabling an additional level of routing protection and a reduction in routing protocol traffic. In addition, all OSPF routing protocol exchanges are authenticated.

OSPF allows sets of networks to be grouped together. Such a grouping is called an area. The topology of an area is hidden from the rest of the Autonomous System. This information hiding enables a significant reduction in routing traffic. Also, routing within the area is determined only by the area's own topology, lending the area protection from bad routing data. In large network deployments, there can be multiple areas. Further, there are situations where a given network device (i.e., a router) may need to be part of more than one OSPF area.

BRIEF SUMMARY OF THE DISCLOSURE

The present disclosure relates to systems and methods for advertising an Internet Protocol (IP) address of loopback interfaces to participating Open Shortest Path First (OSPF) areas. The present disclosure provides advertising an IP address provisioned on a loopback interface to all participating OSPF areas. In particular, the present disclosure provides modifications to the process described in Sec. 12.4.1 in RFC 2328 for building the link descriptions for an interface. The present disclosure advertises the loopback IP address along with router Link State Advertisements (LSAs) for each OSPF area that a network device participates in. No additional LSAs are generated and the flooding scope is bound by the router LSAs (per area). Operationally, no OSPF backbone area is required. Performance wise, routing convergence is bound within an OSPF area.

In an embodiment, a network device includes a plurality of interfaces with at least two interfaces being connected to different Open Shortest Path First (OSPF) areas and having a loopback address; and circuitry configured to advertise the loopback address to each of the OSPF areas in a router Link State Advertisement (LSA). The at least two interfaces can include a first interface in a first OSPF area and a second interface in a second OSPF area, wherein the loopback address is associated with the first OSPF area, and the circuitry advertises the loopback address to the second OSPF area even though the loopback address is for the first OSPF area. Each of the OSPF areas can be a non-backbone area. The network device may not be configured as an area border router. The router LSA can be compliant to RFC 2328. The network device can be a network element in an optical network. The network element can be a Reconfigurable Optical Add/Drop Multiplexer (ROADM) where one of the at least two interfaces is connected to local network devices at a ROADM site and another of the at least two interfaces is connected to an optical span connected to the ROADM.

In other embodiments, the present disclosure includes a method having steps and a non-transitory computer-readable medium with instructions for programming circuitry to implement the steps. The steps include operating a plurality of interfaces with at least two interfaces being connected to different Open Shortest Path First (OSPF) areas and having a loopback address; and advertising the loopback address to each of the OSPF areas in a router Link State Advertisement (LSA). The at least two interfaces can include a first interface in a first OSPF area and a second interface in a second OSPF area, wherein the loopback address is associated with the first OSPF area, and the advertising advertises the loopback address to the second OSPF area even though the loopback address is for the first OSPF area. Each of the OSPF areas can be a non-backbone area. The network device may not be configured as an area border router. The router LSA can be compliant to RFC 2328. The network device can be a network element in an optical network. The network element can be a Reconfigurable Optical Add/Drop Multiplexer (ROADM) where one of the at least two interfaces is connected to local network devices at a ROADM site and another of the at least two interfaces is connected to an optical span connected to the ROADM.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 illustrates the scope of IP reachability and FIG. 2 illustrates an example OSPF deployment with three areas.

DETAILED DESCRIPTION OF THE DISCLOSURE

Again, the present disclosure relates to systems and methods for advertising an Internet Protocol (IP) address of loopback interfaces to participating Open Shortest Path First (OSPF) areas.

Problem Statement

Figure 1:
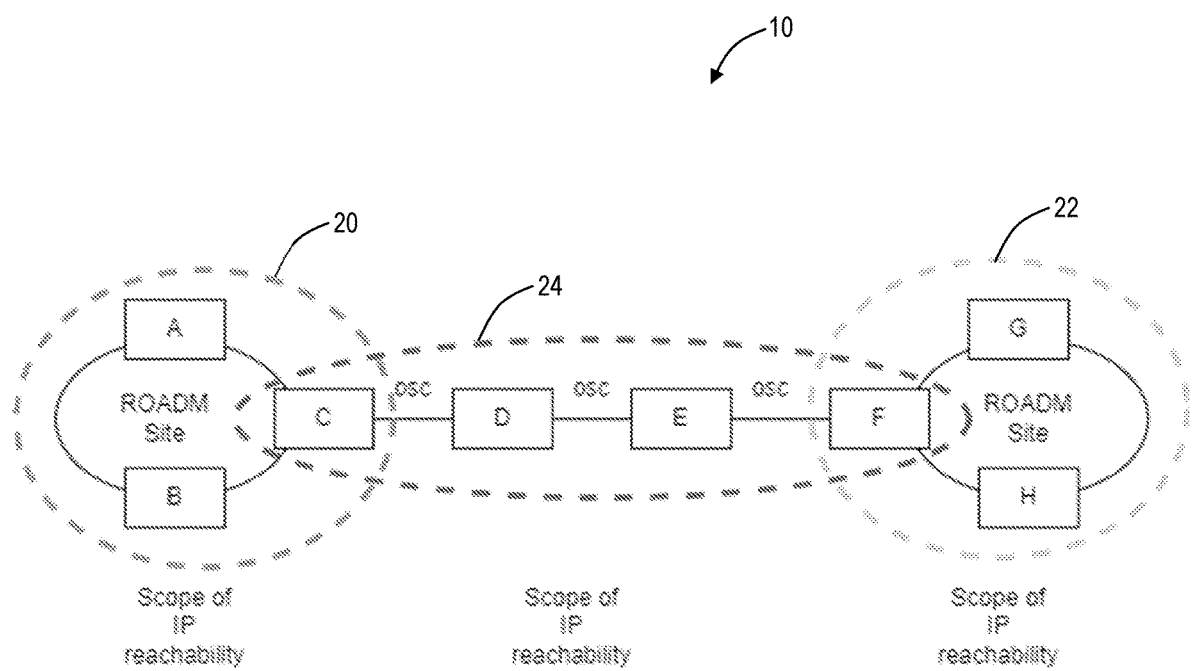
FIGS. 1 and 2 are network diagrams of an optical network with various network devices A-H where
Figure 2:
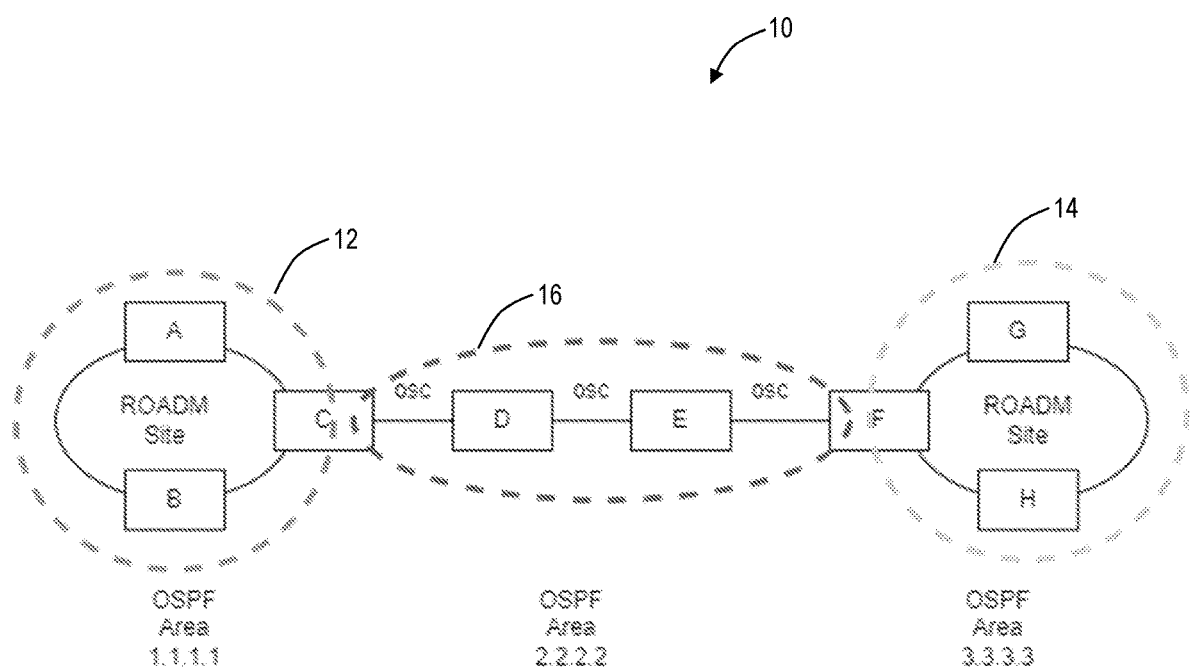

FIGS. 1 and 2 are network diagrams of an optical network 10 with various network devices A-H where FIG. 1 illustrates the scope of IP reachability and FIG. 2 illustrates an example OSPF deployment with three areas 12, 14, 16. The present disclosure is described, for illustration purposes, with respect to an optical network. FIGS. 1 and 2 illustrate a single Optical Multiplex Section (OMS) which is a span in the optical network 10 between two Reconfigurable Optical Add/Drop Multiplexers (ROADMs). Those skilled in the art will recognize that the optical network 10 in FIGS. 1 and 2 is a small portion of a network and practical embodiments will include various additional network elements, OMS spans, etc. Further, those skilled in the art will appreciate the optical network 10 is just one example where there is a need for a network device to participate in multiple OSPF areas. The present disclosure is described with reference to the network devices A-H, and particular to the network devices C, F which need to be part of multiple OSPF areas. In the optical network 10, the network devices A-H are network elements (NEs). Those skilled in the art will recognize the network devices A-H can be any network devices requiring IP reachability, i.e., the present disclosure is not limited to the optical network 10 or NEs.

The optical network 10 has the IP reachability requirement so that the NEs within a ROADM site 20, 22, e.g., the network devices A, B, C in the ROADM 20, and the network devices F, G, H in the ROADM 22, must be reachable and the NEs within a domain, e.g., an OMS span 24 with the network devices C, D, E, F must be reachable. In the example of the optical network 10, the network devices A, B, C, F, G, H can be ROADM degrees, including equipment for the ROADM sites 20, 22. As is known in the art, a degree in a ROADM includes various optical components to support add/drop and express of channels through the ROADM site 20, 22. The network devices A, B, G, H may connect to other OMS spans which are omitted for simplicity of illustration. The network devices C, F connect to the OMS span 24 which can also include the network devices D, E which can be intermediate optical amplifier NEs.

The lines in FIGS. 1 and 2 illustrate IP connectivity. In FIG. 1, the scope of IP reachability is shown. Here, the network devices A, B, C all need to reach one another as there are in the same ROADM site 20. Similarly, the network devices F, G, H all need to reach one another as they are in the same ROADM site 22. Further, the network devices C, D, E, F all need to reach one another as they are in the same OMS span 24. Physically, the network devices A, B, C and the network devices F, G, H may connect to one another via a Local Area Network (LAN) with physical Ethernet ports. The network devices C, D, E, F may connect to one another over a so-called Optical Service Channel (OSC) which can be a dedicated wavelength for data connectivity between the network devices C, F and the optical amplifies at the network devices D, E.

The network devices A, B, D, E, G, H are all in a single OSPF area. However, the network devices C, F each have to participate in two different OSPF areas. In the existing OSPFv2 standard (RFC 2328), an OSPF interface must participate in an OSPF area so that the IP address associated with the interface can be advertised to that area. This is true for all types of interfaces, including loopback interfaces. A loopback interface is a virtual interface in a network device that is always up and active after it has been configured. Similar to a physical interface, a special IP address called a loopback address or loopback IP address is assigned to the virtual interface. With respect to the network devices C, F, there can be two or more interfaces, including one or more unnumbered interfaces, all of which are configured with the same loopback address. This IP address on the loopback interface can be called a shelf IP address, NE IP address, loopback IP address, etc. This IP address is used to identify an NE and therefore needs to be reachable by all the NEs within the scope of IP reachability. For example, in FIG. 1, the network device C has one interface facing the network device D, and two interfaces each facing the network devices A, B, and each needs to be reachable with the loopback address. For example, the network device C can include one or more physical Ethernet ports that connects to the network devices A, B via a LAN, and an unnumbered interface connected to the network device D, and each of the physical Ethernet ports and the unnumbered interface can share the loopback IP address.

In FIG. 2, the typical OSPF deployment to solve the reachability and scalability problem is to configure each ROADM site 20, 22 and each domain (OMS span 24) as a separate OSPF non-backbone area. In theory, one can configure all NEs in a single OSPF area, but the arrangement prevents the network from scaling and therefore is not used often in practice.

Area Border Router

An area border router (ABR) is a router that is located near the border between one or more Open Shortest Path First (OSPF) areas. In the examples of FIGS. 1 and 2, the network devices C, F can be ABRs. There are two types of OSPF area border router (ABR) definitions. RFC 2328 defines an ABR as the network device participating in multiple OSPF areas, while RFC 3509, "Alternative Implementations of OSPF Area Border Routers," April 2003, the contents of which are incorporated by reference in their entirety, defines ABR as the network devices participating in multiple OSPF areas and one of the areas must be backbone area.

Many vendors adopt the ABR definition in RFC 3509. The present disclosure also adopts the ABR definition in RFC 3509 under the context that the OSPF network does not contain a backbone area. As all OSPF areas are non-backbone, the network devices C, F are not an ABR and therefore do not generate Type 3 LSAs, meaning the routes between these non-backbone areas do not leak. A Summary (Type 3) LSA is used for advertising prefixes learned from the Type 1 and Type 2 LSAs into a different OSPF area. This OSPF area arrangement makes it possible for OSPF networks to grow infinitely as the routes/LSAs are self-contained within each OSPF area.

In FIG. 2, the loopback interface of network device C participates in the OSPF area 12 (having an address of 1.1.1.1) and that of the network device F participates in the OSPF area 14 (having an address of 3.3.3.3). Therefore, the loopback IP address of the network devices C, F cannot be reachable by the network devices D, E in the OSPF area 16 (having an address of 2.2.2.2) because the network devices C, F are not ABRs and do not advertise the IP address of the loopback interfaces to OSPF area 16 2.2.2.2. Note that the loopback interface of the network devices C, F belongs to OSPF areas 12, 14, respectively, i.e., 1.1.1.1 and 3.3.3.3.

Typically, in order to allow the network devices D, E to reach the network devices C, F (this is required based on the scope of IP reachability as shown in FIG. 1), a network administrator must either configure the network devices C, F as an OSPF area border router (ABR) using the RFC 2328 definition or redistribute the loopback IP address of the network devices C, F to OSPF if the network devices C, F conform to ABR definition of RFC 3509. In either approach, the network scalability is limited.

The existing solutions include:
(1) configuring all network devices A-H in a single OSPF area. This may work in a small network, but it does not scale. For example, a single OSPF are can typically serve on the order of 150 network devices.
(2) configuring the network devices C, F as an OSPF ABR, as per the ABR definition of RFC 3509. This has several disadvantages. First, with respect to network scalability, unnecessary reachability information (e.g., OSPF LSAs) is flooded into an OSPF area causing the size of OSPF LSA database to grow. The size of the OSPF LSA database bounds the number of network devices that can be deployed in a network. Second, with respect to operational complexity, managing the connectivity of an OSPF backbone area is challenging, e.g., split OSPF backbone area issue, managing ABR to reach OSPF backbone. Finally, for performance, routing convergence, and stability, a route change in one area may cause routing re-calculation in another OSPF area.
(3) redistribute the loopback IP address of the network devices C, F to OSPF. For network scalability, the type 5 external LSAs are flooded to the whole OSPF autonomous system causing the LSA database to grow. Again, the size of the OSPF LSA database bounds the number of network devices that can be deployed in a network. Many operators do not want these LSAs to be flooded to their data communication network (DCN) OSPF networks.

Solution

The present disclosure configures the network devices C, F to advertise their loopback IP address to all OSPF areas the network devices C, F participate in, e.g., the OSPF areas 12, 16 for the network device C, and the OSPF areas 14, 16 for the network device F. That is, the network device C advertises its loopback IP address to both area 1.1.1.1 and 2.2.2.2 via router LSAs, and the network device F advertises its loopback IP address to both area 3.3.3.3 and 2.2.2.2 via router LSAs.

Note, unlike the OSPF ABR configuration, the loopback IP address of the rest of the network devices C, F in one area do not leak to another area. For example, the loopback IP address of the network devices A, B are not visible to the network devices D, E, F. Therefore, the number of OSPF LSAs are well controlled within an OSPF area.

Router LSAs

A router, i.e., the network devices A-H, originates a router-LSA for each area that it belongs to. Such an LSA describes the collected states of the router's links to the area. The LSA is flooded throughout the particular area, and no further. The format of a router-LSA is described in RFC 2328 Appendix A (Section A.4.2). The router-LSA then describes the router's working connections (i.e., interfaces or links) to the area. Each link is typed according to the kind of attached network. Each link is also labelled with its Link ID. This Link ID gives a name to the entity that is on the other end of the link. In addition, the Link Data field is specified for each link. This field gives 32 bits of extra information for the link. Finally, the cost of using the link for output is specified. The output cost of a link is configurable.

Figure 3:
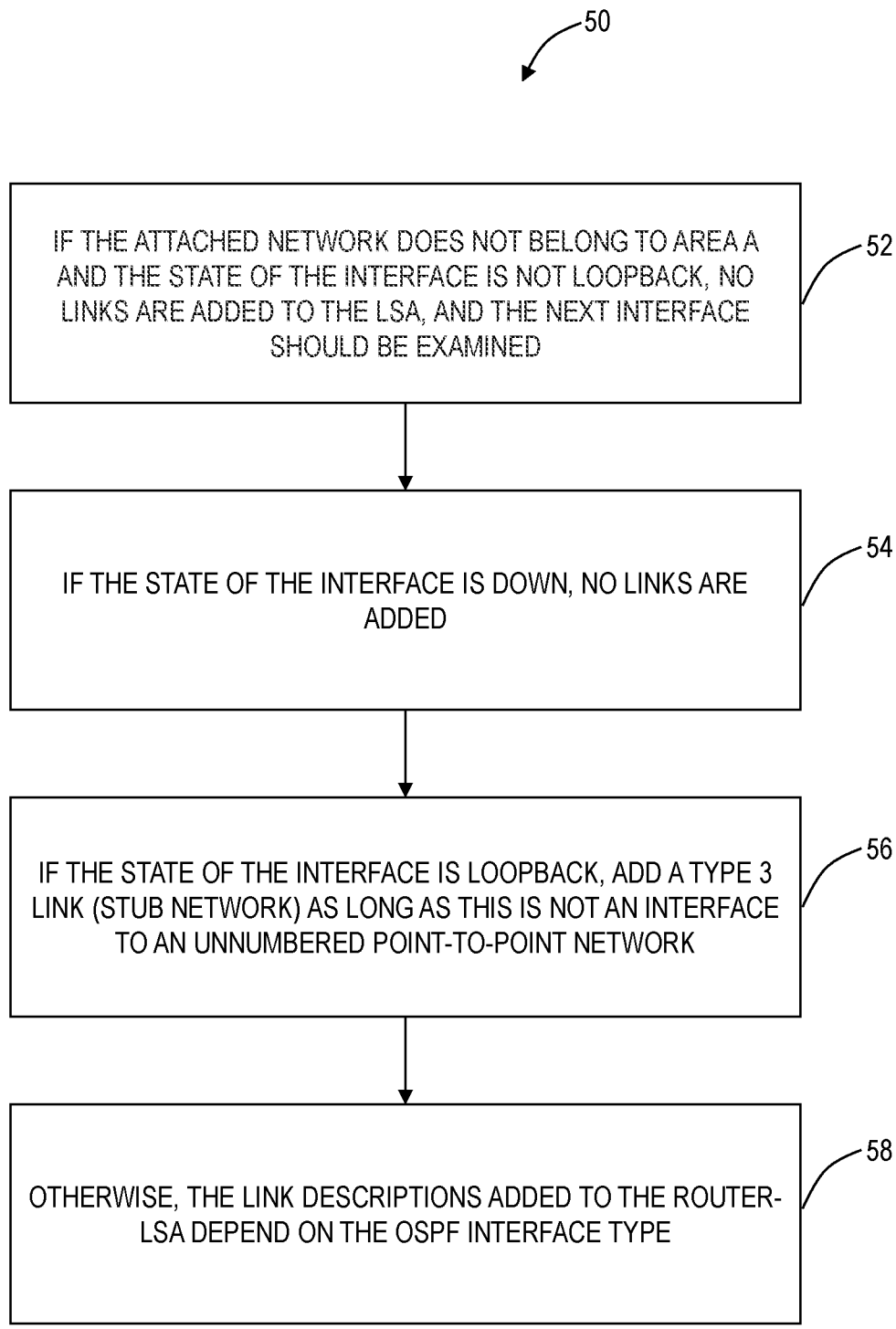
FIG. 3 is a flowchart of a process of building the list of link descriptions, based on RFC 2328, Sec. 12.4.1, along with modifications to support advertising a loopback IP address to multiple OSPF areas.

FIG. 3 is a flowchart of a process 50 of building the list of link descriptions, based on RFC 2328, Sec. 12.4.1, along with modifications to support advertising a loopback IP address to multiple OSPF areas. The process 50 contemplates implementation as a method having steps, via a router or network device configured to implement the steps, and as a non-transitory computer-readable medium storing instructions for programming circuitry to implement the steps. For illustrating the process 50, suppose a router wishes to build a router-LSA for Area A. The router examines its collection of interface data structures. As described herein, an interface is a data connection, such as a physical connection, an unnumbered interface, etc.

For each interface, the process 50 includes the following steps, which are used to determine what link descriptions are included in a router-LSA for that interface. If the attached network does not belong to Area A and the state of the interface is not loopback, no links are added to the LSA, and the next interface should be examined (step 52). If the state of the interface is Down, no links are added (step 54).

If the state of the interface is Loopback, add a Type 3 link (stub network) as long as this is not an interface to an unnumbered point-to-point network (step 56). Otherwise, the link descriptions added to the router-LSA depend on the OSPF interface type (step 58).

Effectively, the present disclosure changes the original step described in RFC 2328 of "If the attached network does not belong to Area A, no links are added to the LSA, and the next interface should be examined" to "If the attached network does not belong to Area A and the state of the interface is not Loopback, no links are added to the LSA, and the next interface should be examined." This allows the network device C to add its loopback IP address into the router LSA for area 1.1.1.1 as well as the router LSA for area 2.2.2.2. The network device F adds its loopback IP address into the router LSA for area 3.3.3.3 as well as the router LSA for area 2.2.2.2. As a result, the network devices A, B, C can reach each other, the network devices C, D, E, F can reach each other, and the network devices F, G, H can reach each other. Hence the requirement of the IP reachability as stated above is achieved without adding extra operational complexity.

Process

Figure 4:
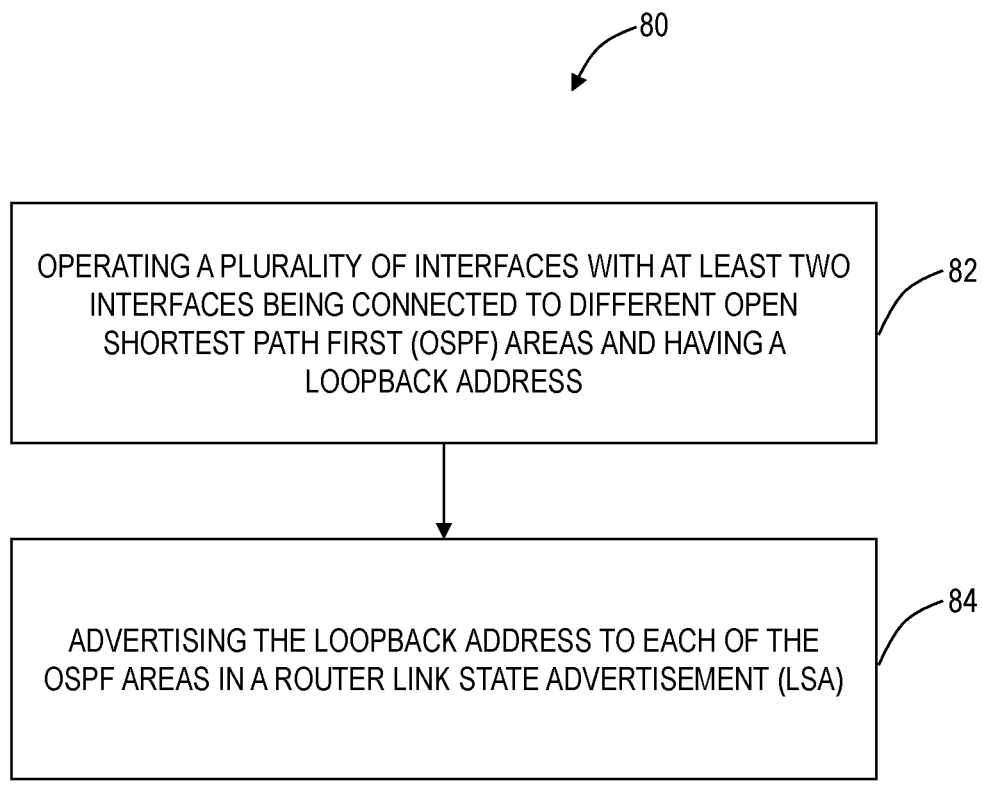
FIG. 4 is a flowchart of a process for advertising an IP address of loopback interfaces to participating OSPF areas.

FIG. 4 is a flowchart of a process 80 for advertising an IP address of loopback interfaces to participating OSPF areas. The process 80 contemplates implementation as a method having steps, via a router or network device configured to implement the steps, and as a non-transitory computer-readable medium storing instructions for programming circuitry to implement the steps. The steps include operating a plurality of interfaces with at least two interfaces being connected to different Open Shortest Path First (OSPF) areas and having a loopback address (step 82); and advertising the loopback address to each of the OSPF areas in a router Link State Advertisement (LSA) (step 84).

The at least two interfaces can include a first interface in a first OSPF area and a second interface in a second OSPF area, wherein the loopback address is associated with the first interface, and the advertising advertises the loopback address to the second OSPF area even though the first interface does not belong to the second OSPF area because the first interface has the loopback address. Each of the OSPF areas can be a non-backbone area. The network device are not configured as an area border router. The at least two interfaces can include at least one unnumbered interface. The router LSA can be compliant to RFC 2328.

The network device can be a network element in an optical network. The network element can be a Reconfigurable Optical Add/Drop Multiplexer (ROADM) where one of the at least two interfaces is connected to local network devices at a ROADM site and another of the at least two interfaces is connected to an optical span connected to the ROADM.

Example Network Element

Figure 5:
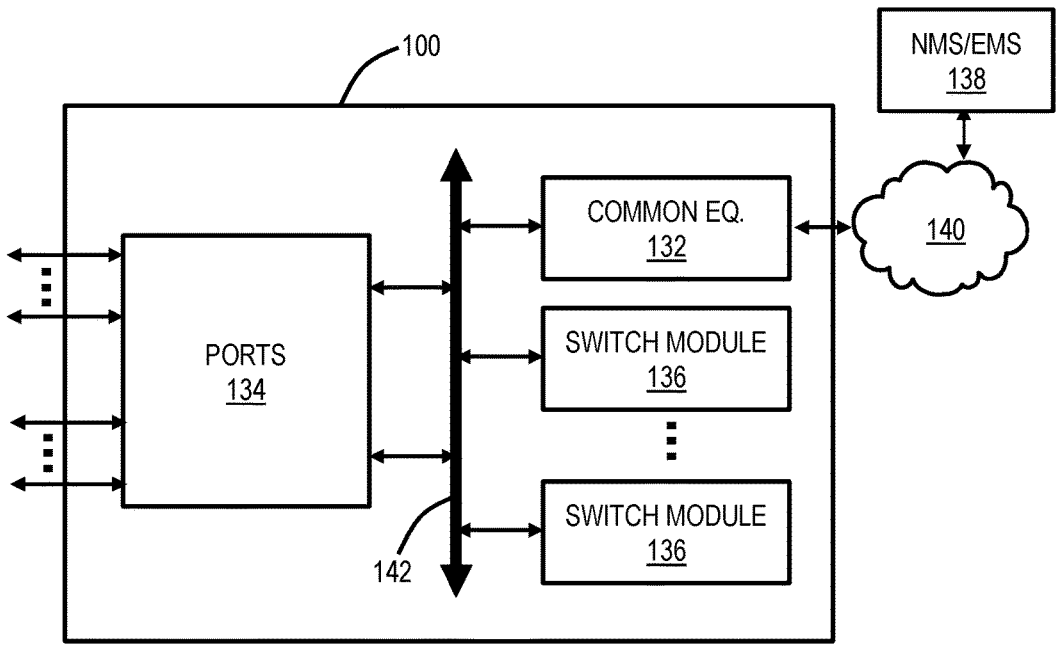
FIG. 5 is a block diagram of an example network element for use with the systems and methods described herein.

FIG. 5 is a block diagram of an example network element 100 for use with the systems and methods described herein. In an embodiment, the network element 100 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 100 can be any of a ROADM, an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 100 can be any digital system with ingress and egress digital signals and switching of channels, timeslots, tributary units, etc., as well as an optical system with ingress and egress of optical channels.

In an embodiment, the network element 100 includes common equipment 132, ports 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network 140 (as well as a Path Computation Element (PCE), Software Defined Networking (SDN) controller, etc.). The management system 138 can include a Network Management System (NMS), Element Management System (EMS), or the like. Additionally, the common equipment 132 can include a control plane processor, such as a controller 200 illustrated in FIG. 6. The network element 100 can include an interface 142 for communicatively coupling the common equipment 132, the ports 134, and the switch modules 136 to one another. For example, the interface 142 can be a backplane, midplane, a bus, optical or electrical connectors, or the like. The ports 134 are configured to provide ingress and egress to the switch modules 136 and to external connections on the links to/from the network element 100. In an embodiment, the ports 134 can form ingress and egress switches with the switch modules 136 as center stage switches for a three-stage switch, e.g., a three-stage Clos switch. Other configurations and/or architectures are also contemplated. The ports 134 can include optical transceivers, including pluggable optical modules and the like, electrical transceivers, etc.

Further, the ports 134 can include a plurality of connections per module and each module may include a flexible rate support for any type of connection. The ports 134 can include wavelength division multiplexing interfaces, short reach interfaces, and the like, and can connect to other ports 134 on remote network elements, end clients, edge routers, and the like, e.g., forming connections on the links in the optical network 10. From a logical perspective, the ports 134 provide ingress and egress ports to the network element 100, and modules can include one or more physical ports 134.

The switch modules 136 are configured to switch channels, timeslots, tributary units, packets, etc. between the ports 134. For example, the switch modules 136 can provide wavelength granularity (Layer 0 switching); OTN granularity (Layer 1 switching); packet switching; and the like. Specifically, the switch modules 136 can include Time Division Multiplexed (TDM) (i.e., circuit switching) and/or packet switching engines. The switch modules 136 can include redundancy as well, such as 1:1, 1:N, etc.

Those of ordinary skill in the art will recognize the network element 100 can include other components which are omitted for illustration purposes, and that the systems and methods described herein are contemplated for use with a plurality of different network elements with the network element 100 presented as an example type of network element. For example, in another embodiment, the network element 100 may not include the switch modules 36, but rather have the corresponding functionality in the line modules 34 (or some equivalent) in a distributed fashion. In a further embodiment, the network element 100 may not include modules, but rather be an integrated device. That is, the components 132, 134, 136 can be viewed as functional components that may be realized in any manner. For the network element 100, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the network element 100 is merely presented as one network element 100 for the systems and methods described herein. FIG. 5 is meant to provide a functional view, and those of ordinary skill in the art will recognize actual hardware implementations may vary; all of which are contemplated herewith.

Example Controller

Figure 6:
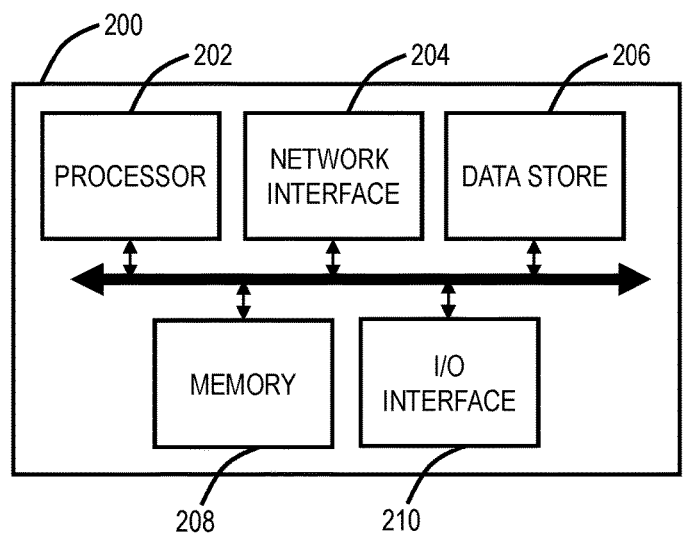
FIG. 6 is a block diagram of an example processing device.

FIG. 6 is a block diagram of an example processing device 200. The processing device 200 can be part of the terminal network element 100. Also, the processing device 200 can be referred to in implementations as a control module, a shelf controller, a shelf processor, a system controller, etc. The processing device 200 can be configured to perform the various functions described herein. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can also include unnumbered interfaces, such as one to communicate on the OSC. The network interface 204 can include address, control, and/or data connections to enable appropriate communications on the network. The network interface 204 can support the loopback IP address for a plurality of interfaces. Specifically, the processing device 200, via the network interface 204, can implement various OSPF techniques described herein.

The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A network device comprising:
a plurality of interfaces with at least two interfaces being connected to different Open Shortest Path First (OSPF) areas and having a loopback address, wherein the at least two interfaces include a first interface in a first OSPF area and a second interface in a second OSPF area, wherein the loopback address is for the first OSPF area; and
circuitry configured to advertise the loopback address to each of the OSPF areas by inserting the loopback address in a router Link State Advertisement (LSA) originated for each respective OSPF area, wherein no summary LSAs or external LSAs are generated for the loopback address and the network device is not configured as an area border router,
wherein the circuitry advertises the loopback address to the second OSPF area even though the loopback address is for the first OSPF area, by inserting the loopback address into router LSAs originated for each OSPF area rather than redistributing the address in summary or external LSAs.

2. The network device of claim 1, wherein each of the OSPF areas is a non-backbone area.

3. The network device of claim 1, wherein the router LSA is compliant to RFC 2328.

4. The network device of claim 1, wherein the network device is a network element in an optical network, and at least one of the plurality of interfaces is an unnumbered interface that shares the loopback address.

5. The network device of claim 4, wherein the network element is a Reconfigurable Optical Add/Drop Multiplexer (ROADM) where one of the at least two interfaces is connected to local network devices at a ROADM site via a Local Area Network (LAN) and another of the at least two interfaces is connected to an optical span connected to the ROADM via an Optical Service Channel (OSC).

6. A non-transitory computer-readable medium comprising instructions for programming circuitry in a network device to implement steps of:

operating a plurality of interfaces with at least two interfaces being connected to different Open Shortest Path First (OSPF) areas and having a loopback address, wherein the at least two interfaces include a first interface in a first OSPF area and a second interface in a second OSPF area, wherein the loopback address is associated with the first interface; and advertising the loopback address to each of the OSPF areas by inserting the loopback address in a router Link State Advertisement (LSA) originated for each respective OSPF area, wherein no summary LSAs or external LSAs are generated for the loopback address and the network device is not configured as an area border router;

wherein the advertising advertises the loopback address to the second OSPF area even though the loopback address is for the first OSPF area, by inserting the loopback address into router LSAs originated for each OSPF area rather than redistributing the address in summary or external LSAs.

7. The non-transitory computer-readable medium of claim 6, wherein each of the OSPF areas is a non-backbone area.

8. The non-transitory computer-readable medium of claim 6, wherein the router LSA is compliant to RFC 2328.

9. The non-transitory computer-readable medium of claim 6, wherein the network device is a network element in an optical network, and at least one of the plurality of interfaces is an unnumbered interface that shares the loopback address.

10. The non-transitory computer-readable medium of claim of claim 9, wherein the network element is a Reconfigurable Optical Add/Drop Multiplexer (ROADM) where one of the at least two interfaces is connected to local network devices at a ROADM site via a Local Area Network (LAN) and another of the at least two interfaces is connected to an optical span connected to the ROADM via an Optical Service Channel (OSC).

11. A method implemented by a network device comprising steps of:

operating a plurality of interfaces with at least two interfaces being connected to different Open Shortest Path First (OSPF) areas and having a loopback address, wherein the at least two interfaces include a first interface in a first OSPF area and a second interface in a second OSPF area, wherein the loopback address is associated with the first interface; and advertising the loopback address to each of the OSPF areas by inserting the loopback address in a router Link State Advertisement (LSA) originated for each respective OSPF area, wherein no summary LSAs or external LSAs are generated for the loopback address and the network device is not configured as an area border router, wherein the advertising advertises the loopback address to the second OSPF area even though the loopback address is for the first OSPF area, by inserting the loopback address into router LSAs originated for each OSPF area rather than redistributing the address in summary or external LSAs.

12. The method of claim 11, wherein each of the OSPF areas is a non-backbone area.

13. The method of claim 11, wherein the router LSA is compliant to RFC 2328.

14. The method of claim 11, wherein the network device is a network element in an optical network, and at least one of the plurality of interfaces is an unnumbered interface that shares the loopback address.

* * * * *